US012070036B2

(12) United States Patent
Kaplan et al.

(10) Patent No.: US 12,070,036 B2
(45) Date of Patent: Aug. 27, 2024

(54) METHODS AND COMPOSITIONS COMPRISING NEMATODE SIGNALLING COMPOUNDS

(71) Applicant: PHERONYM, INC., Davis, CA (US)

(72) Inventors: Fatma Kaplan, Davis, CA (US); Cameron Schiller, Davis, CA (US); Abigail Perret-Gentil, Micanopy, FL (US)

(73) Assignee: PHERONYM, INC., Woodland, CA (US)

( * ) Notice: Subject to any disclaimer, the term of this patent is extended or adjusted under 35 U.S.C. 154(b) by 674 days.

(21) Appl. No.: 16/981,995

(22) PCT Filed: Mar. 20, 2019

(86) PCT No.: PCT/US2019/023139
§ 371 (c)(1),
(2) Date: Sep. 17, 2020

(87) PCT Pub. No.: WO2019/183207
PCT Pub. Date: Sep. 26, 2019

(65) Prior Publication Data

US 2021/0030009 A1 Feb. 4, 2021

Related U.S. Application Data

(60) Provisional application No. 62/645,674, filed on Mar. 20, 2018.

(51) Int. Cl.
*A01N 63/12* (2020.01)
(52) U.S. Cl.
CPC .................................... *A01N 63/12* (2020.01)

(58) Field of Classification Search
None
See application file for complete search history.

(56) References Cited

U.S. PATENT DOCUMENTS

| | | | |
|---|---|---|---|
| 9,534,008 B2 | 1/2017 | Choe et al. | |
| 10,736,326 B2 | 8/2020 | Kaplan et al. | |
| 2014/0303360 A1 | 10/2014 | Schroeder et al. | |
| 2014/0364386 A1* | 12/2014 | Choe | A61P 1/12 514/32 |
| 2016/0037741 A1 | 2/2016 | Klessig et al. | |

FOREIGN PATENT DOCUMENTS

| | | |
|---|---|---|
| WO | WO 2013/022997 A3 | 2/2013 |
| WO | WO2014145380 A2 | 2/2016 |
| WO | WO2019183207 A1 | 3/2019 |

OTHER PUBLICATIONS

European Patent Office Supplemental Search Report for 19771678.0.
Zhou et al. Potential Nematode Alarm Pheromone Induces Acute Avoidance in Caenorhabditis elegans. Genetics, vol. 206, 1469-1478 Jul. 2017.
Choe et al. Ascaroside Signaling Is Widely Conserved among Nematodes. Current Biology 22, 772-780, May 8, 2012.

Kaplan et al. Interspecific Nematode Signals Regulate Dispersal . PlosOne, Jun. 2012 Volume 7 | Issue 6 e38735.

* cited by examiner

*Primary Examiner* — Nghi V Nguyen
(74) *Attorney, Agent, or Firm* — Yong-Horng Liu

(57) ABSTRACT

Plant parasitic nematodes prefer to infect uninfected over infected hosts. A specific mixture of pheromones (a.k.a. ascarosides) tells plant parasitic nematodes the host status. We use a mixture of pheromones to direct nematodes away from the healthy roots. The pheromone mixture will be used for seed treatments to protect plant roots from infection by telling the nematodes that the plant is already infested and that they should move away and find new hosts. Chemical synthesis of pheromones is expensive, particularly when it is contains multiple compounds. Therefore, we obtained a partial mixture from *Steinernema* growth medium which provided 15% more directional movement away from the application site. We complete the necessary pheromone from the growth medium of *Heterorabditis* species to direct nematodes away from the seeds and roots of healthy plants. The pheromone mixture will be used to in the irrigation water or seed treatment to direct the plant parasitic nematodes away from the plant roots.

10 Claims, 1 Drawing Sheet

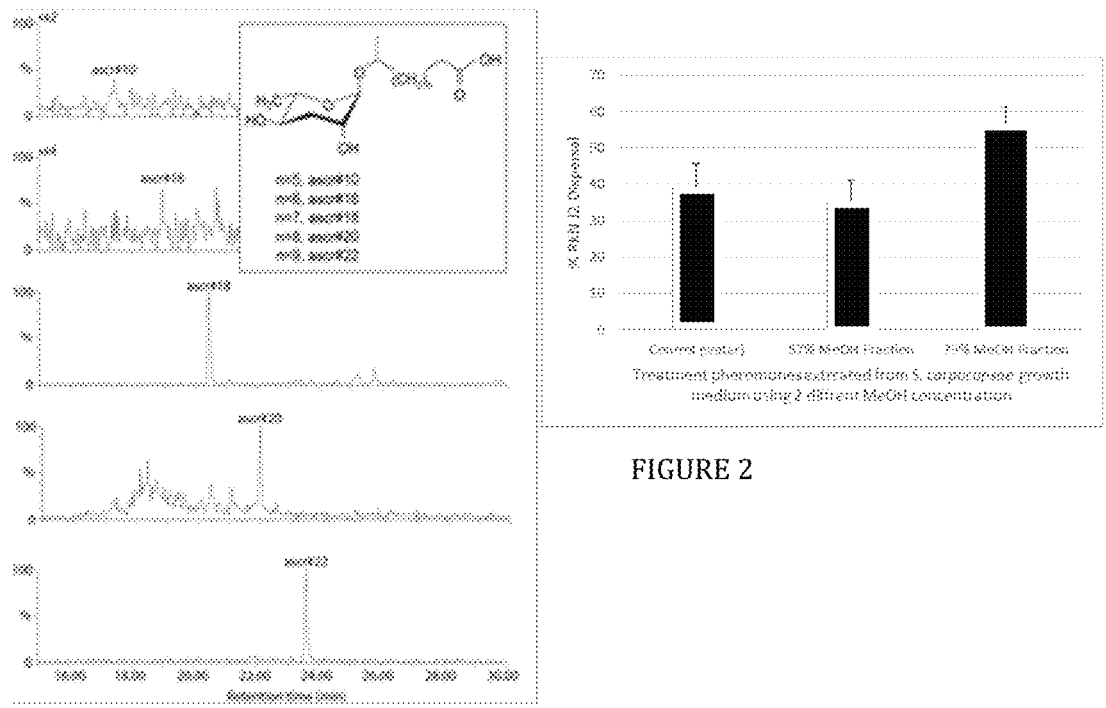
FIGURE 1
FIGURE 2
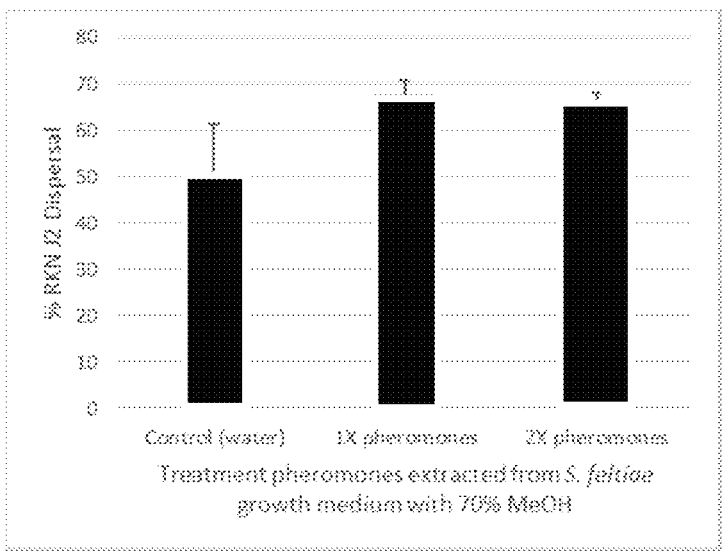
FIGURE 3

METHODS AND COMPOSITIONS COMPRISING NEMATODE SIGNALLING COMPOUNDS

FIELD OF THE INVENTION

Using nematode host status pheromones to repel plant parasitic nematodes to prevent nematode infection of healthy plant seeds and roots.

BACKGROUND OF THE INVENTION

Plant parasitic nematodes are one of the major contributors to the reduced yield, biomass and quality of agronomically important crops. They cause more than $100 billion worth of crop loss worldwide annually. Root knot nematodes, RKN, (*Meloidogyne* spp.) are among the most economically important plant parasites worldwide (Castagnone-Sereno et al. 2013). Other agronomically important nematodes include; cyst nematode (*Heterodera glycines*), and lesion nematode (*Pratylenchus brachyurus*). They reduce net photosynthesis resulting in reduction in plant yield and biomass accumulation (Fortnum et al. 1991) and threaten our food security. Plant parasitic nematodes were effectively controlled by the soil fumigant methyl bromide, a broad spectrum, powerful biocide (Zasada et al. 2010). However, methyl bromide and many other nematicides were removed from the market for adverse environmental and health effects. Other nematicides currently used are extremely toxic, pollute groundwater and are either in the process of being removed from the market or stated for removal (EPA 2010, Msayleb and Ibrahim 2011, Aggarwal et al. 2013). We need smart, environmentally friendly control methods for plant parasitic nematodes.

Pheromones have provided ecologically and environmentally sound control of plant insect pests (Cook et al. 2007). To control insects, aggregation and mating pheromones are used to interfere with mating and reduce reproduction (Khan et al. 2000, Silverstein, 1981). Recently, it has been shown that *Caenorhabditis elegans* and insect parasitic nematodes (EPN) also use pheromones for social behaviors such as mating (Srinivasan et al. 2008, Kaplan et al. 2012, Choe et al. 2012). For example, *C. elegans* communicates about food shortage and signals to younger generation to turn into dauer form and search for new bacterial lawns. This signal is called dispersal, a mixture of pheromones. When we add a dispersal pheromone, *C. elegans* dauer larvae leave perfectly good food (Kaplan et al. 2012). Furthermore, *C. elegans* dispersal blend is recognized by other nematode species called entomopathogenic nematodes (EPNs) (Kaplan et al. 2012). EPNs have symbiotic bacteria which kill the insect host when EPNs enter the host. The symbiotic bacteria feeds on the insect. The EPNs feed on the bacteria. Both EPNs and *C. elegans* feed on bacteria. Since their food is bacteria we hypothesized that they would recognize each other's signals. Plant parasitic nematodes have a different food source from EPNs, so they may not be able recognize the *C. elegans*' dispersal signal as well as EPNs do. Not surprisingly, RKN do not recognize the *C. elegans* signal as well as EPNs (Kaplan et al 2012).

RKN may have their own pheromone mixture to signal younger generations that a prospective host plant does not have resources. RKNs are sedentary nematodes but they have a free form which is called J2 larval stage (infective juvenile) which enters the plant from the root tip. Then the J2 establishes a feeding site/giant cells (major nutrient sinks in the root), becomes sedentary and reproduces (Perry et al. 2009). Furthermore, in the literature, it has been reported that *Meloidogyne* species prefer uninfected over infected roots when given a choice (Manzanilla-Lopez and Starr 2009). It is very important for RKN to recognize host status due to its sedentary life cycle. If it chooses the wrong host, it cannot reproduce because if the host dies, the nematode dies too. Since we know other nematodes use the pheromone communication, we hypothesized that RKN uses a mixture of pheromones to recognize host status and does not infect overcrowded hosts. First, the Kaplan lab found that root-knot nematodes (RKN) have pheromones (a.k.a. ascaroside) inside the infective juveniles/J2. Then we demonstrated that J2 also release pheromones like the other nematode species (Manosalva et al 2015).

Like insect pheromones, nematode pheromones can provide an ecologically friendly control of plant parasitic nematodes. Since nematode pheromones are water soluble, we can use them in seed treatments where insect pheromones have never been used. This invention the first time expands pheromones' use to row crops such as corn, cotton, soybean, and sugar beets to protect plant roots from plant parasitic nematodes. Since the pheromones are active at very low concentrations, they will reduce the amount of chemicals used in the environment and will be confined to a space where seed is planted. Furthermore, to make nematode pheromone seed treatment commercially viable we still need to know a specific mixture to be able to reduce the number of compound synthesized and specific ratios to fully realize the eco-friendly potential of these pheromones.

BRIEF DESCRIPTION OF THE DRAWINGS

FIG. 1. Ascarosides found inside *Meloidogyne* spp. (*M. floridensis*, *M. javanica*, and *M. incognita*) dispersal larvae/J2. The ascarosides in the interior of 10000 *Meloidogyne* spp. (mixture of *M. floridensis*, *M. javanica*, and *M. incognita*) was confirmed by the Schroeder lab (Kaplan unpublished 2011, Manosalva et al. 2015). Ascarosides were extracted in 70% Ethyl alcohol and assessed by HPLC-MS.

FIG. 2. RKN J2 responds to pheromones purified from *S. carpocapsae* growth medium within 2 hours. The 57% MeOH extraction only contains one pheromone, ascr #10, which is also secreted by RKN. J2 do not respond to a single pheromone. The 73% MeOH extraction includes both ascr #10 and ascr #18. Both of these pheromones are released by RKN J2. We can already see a synergy and recognition and 15% more J2 left the pheromone application spot due to recognition of the pheromone signals. The extract does not have any methanol; it was resuspended in water. The figure is representative of the 2 independent experiments repeated in time and each experiment has 6 independent replications.

FIG. 3. RKN J2 response to pheromones extracted from *S. feltiae* growth medium within 2 h of exposure. Control has only water. Pheromones resuspended in water. The experiment has 5 independent replications.

SUMMARY OF THE INVENTION

A composition comprising pheromones (a.k.a. ascarosides) that tells the plant parasitic nematodes the host status, including a specific mixture of pheromones which, when applied to seeds or plants or roots thereof, permits nematodes to differentiate between infected plants from healthy (uninfected) plants, and to migrate toward healthy plants and away from already infected plant roots seeds and other plant parts. The pheromone compositions according to this invention are used, for example, as seed treatments to protect the plant roots from infection by causing potential plant parasitic nematodes to sense that plants and seeds treated with the composition of this invention is already infested. The pheromone mixture can be obtained using secretions from plant parasitic nematodes or growth medium of beneficial and parasitic nematodes. Methods for purifying pheromone compositions of matter are disclosed for producing signals that plant parasitic nematodes recognize as indicating an infected plant to cause the parasites to leave the treated plant alone. Once the compositions of matter according to this invention are disclosed, those skilled in the art are able to appreciate and develop methods for manufacture of the cognate individual compounds to synthetically create the composition of matter according to this invention.

DETAILED DESCRIPTION OF THE PREFERRED EMBODIMENTS OF THE INVENTION

Identifying pheromone signals that tell host status to plant parasitic nematodes is difficult. First, RKNs avoid plant extracts. This is not surprising because their survival depends on selecting healthy plants to reproduce. Since the nematodes release pheromones to their environment and for RKN, this environment is plant tissue. To isolate RKN pheromones from plant tissue, we have to detach and kill the plant. Therefore, the pheromone mix we isolate from the detached plants will have dead plant signals. That makes isolating pheromones from nematode infected plant roots impossible. Therefore, we first determined whether plant parasitic nematodes produce and release pheromones using J2 which is the freely moving and non-feeding life stage, to reduce plant metabolite contamination (Kaplan unpublished 2011 and Manosalva 2015). J2 release pheromones ascr #10 through ascr #26 (Kaplan unpublished 2011 and Manosalva 2015) in FIG. 1.

We hypothesized that a mixture of ascr #10, ascr #18, ascr #22 and ascr #26 act as host status signal for overcrowded host and decreased resources to plant parasitic nematodes. Since these pheromones are not produced commercially, and no viable large scale synthetic production yet exists, we needed a system that is commercially viable and mimics plant parasitic nematode pheromone mix that we to provide a raw material from which to purify the relevant pheromones.

We devised an alternative system that mimics plant parasitic nematode pheromone mixture and is free of dead plant signals. First, we tested entomopathogenic nematode host cadaver extracts, which has an incomplete mixture of plant parasitic nematode pheromones, to determine whether just the dead tissue extract would deter plant parasitic nematodes.

We extracted the pheromones with 58% and 73% Methyl alcohol using *S. carpocapsae* insect host cadavers, the growth medium for *S. carpocapsae*. Then the extracts were dried and re-suspended in MILLIQ water. Centrifuged at 6000 r.c.f. to remove insoluble material and then dried using a speed vac. In FIG. 2, RKN J2 did not respond to pheromones extracted using 57% MeOH. This particular fraction only included one ascaroside, ascr #10, common between RKN and *S. carpocapsae*. While this single common ascaroside did not elicit any response, we discovered that pheromones extracted using 73% extract did elicit the desired response. The 73% MeOH extract contained two common pheromones, ascr #10 and ascr #18, between RKN and *S. carpocapsae*. The two pheromones together caused 15% more RKN J2 to move away from the application site compared to water control.

We tested this with one more *Steinernema* species growth medium. We extracted the pheromones using 70% MeOH from the *S. feltiae* growth medium (insect host cadavers). This particular extraction contains the two common ascarosides, ascr #10 and ascr #18, between RKN and *Steinernema* species.

In FIG. 3, consistent with *S. carpocapsae* pheromones we saw increased dispersal away from the application site indicating that this is due to the pheromone mixture. Furthermore, the specific mixture, not the concentration, had an effect on the movement rate. We tested 2 times pheromone concentration which did not increase the number of J2 that left the application site. Since ascr #10 and ascr #11 are the only common ascarosides between *Steinernema* and RKN species, we looked at other species that release ascarosides that RKN J2 release. We found that *Heterorabditis bacteriophora* releases asr #18, ascr #20, ascr #22, ascr #24 and ascr #26, which are also released by RKN J2.

A mixture of 1:1 *Steinernema* spp and *Heterorhabditis* spp growth medium (insect host cadaver or liquid culture) that produces IJs will reconstitute plant parasitic nematode host status signal. This media can be used to purify pheromone mixture that will signal to RKN J2 that a host is over-crowded and they need to find another host. Nematodes with common hosts recognize the same common signal for food availability. We hypothesize the same mixture will be recognized by other plant parasitic nematodes that feed on the plant root.

In light of the foregoing, those skilled in the art will appreciate that this patent disclosure provides a generalized method whereby the growth medium that produces infective juveniles of various nematode species to produce a nematode repellant composition.

In one embodiment according to this invention, *Heterorabditis* species and *Steinernema* species are grown in a growth medium which is collected and used to prevent nematode infection of plants. Of course, those skilled in the art will appreciate that other nematode species may be used according to the method of this invention and that similar compositions of matter as compared to those disclosed herein may be prepared. The specific mixture of pheromones (a.k.a. ascarosides) identified herein provides signals to plant parasitic nematodes whereby the host plant nematode infection status is announced to potential parasites. The pheromone mixture is used for seed treatments to protect plant roots from infection by telling the nematodes that the plant is already infested and that they should move away and find new hosts. While Chemical synthesis of pheromones is expensive, particularly when it is contains multiple compounds, the composition of matter according to this invention provides a basis for those skilled in the art to produce the individual chemicals to reproduce the active principles of the composition according to this invention. Thus, as herein disclosed, a partial mixture from *Steinernema* growth medium, which provided 15% more directional movement away from the application site, was supplemented with pheromone from the growth medium of *Heterorabditis* species, to direct nematodes away from the seeds and roots of healthy plants. The pheromone mixture is used in the irrigation water or seed treatment to direct the plant parasitic nematodes away from the plant roots.

Accordingly, this invention includes a composition of matter comprising nematode pheromones which causes a plant parasitic nematode to sense that a potential host plant is already infected with plant parasitic nematodes. The composition preferably comprises ascr #10, ascr #18, ascr #20, ascr #22, and ascr #26. This composition deters plant parasitic nematodes away from plant roots when included in irrigation systems, or when used to treat seeds, by itself or in combination with at least one pesticide, biocontrol organisms, or biopesticide. The composition may likewise be used to treat stem and bulbs to move the plant parasitic nematodes away from the healthy plants. A composition according to this invention may comprise ascr #10, ascr #18, ascr #20, ascr #22, and ascr #26, (referred to herein as A10, A18, A20, A22, and A26) in ratios of between 100:1 to 1:100 in relation to each other. In one embodiment, these pheromones are present in equimolar amounts. In another embodiment, the ratio of A10:A18:A20:A22:A26 is defined by routine experimentation. In some embodiments, it may not be necessary to include all five of these pheromones to obtain the desired activity. At least two, three, four or five of these pheromones, when presented together, are required to come within the scope of this invention to achieve the repellant effect desired. For example, Ascr #10 or ascr #18 are not active by themselves as a repellent, but are active when presented together. A minimum number of ascarosides to obtain the activity are ascr #10 and ascr #18 (1:2 ratio of ascr #10:ascr #18) that would produce 17% more dispersal compared to control. We have discovered that a composition comprising only ascr #10, ascr #18 in various ratios provides the desired activity. In a further preferred composition, in addition to ascr #10 and ascr #18, ascr #20, ascr #22, and/or ascr #26 are included in various ratios, permutations and combinations. Preferred combinations include all reasonable permutations of at least two of these ascarosides.

Ratios of 0.5:6:1:2:1:2 for ascr #10:ascr #18:ascr #20:ascr #22:ascr #24:ascr #26, are desirable. These ratios may also be represented as:

ascr #10=0.5; ascr #18=6; ascr #20=1; ascr #22=2; ascr #24=1; ascr #26=2

Based on this disclosure, those skilled in the art are able to optimize ratios to achieve desired effects in a given situation. Total dosages may be extremely low to achieve results. Nanomolar to millimolar concentrations of each ascaroside is generally adequate and, in particular, when used as a seed coating, total ascaroside concentration may be low while still achieving a desirable effect.

The composition comprising nematode pheromones which causes a plant parasitic nematode to sense that a potential host plant is already infected with plant parasitic nematodes is prepared by a method including the following steps or equivalents thereof:

a. Extracting nematode pheromones from infected plant roots, or purifying pheromones mixture from other nematodes species' growth medium;
b. Purifying the pheromones from growth medium of *Heterorhabditis*, and *Steinernema* spp., individually or after mixing of growth media, wherein said growth media are selected from the insect host or the artificial liquid growth medium which produces infective juveniles. In a more specific embodiment, the method comprises the following steps or equivalents thereof:
  a. Growing infective juveniles of *Heterorabditis* species in a growth medium and retaining the growth medium after removing the *Heterorabditis* species therefrom;
  b. Growing infective juveniles of *Steinernema* species in a growth medium and retaining the growth medium after removing the *Steinernema* species therefrom;
  c. Drying each said growth medium, either separately or after mixing said growth media from each species an appropriate ratio;
  d. Extracting pheromone from the growth media that has been dried, using an organic solvent, followed by drying;
  e. Resuspending the product of step (d) in distilled water or another appropriate aqueous medium;
  f. Removing insoluble material by centrifugation or filtration and retaining the liquid for further purification;
  g. Removing small chain ascaroside pheromone by non-adhesion to a hydrophobic medium washed with a low enough concentration of organic solvent which does not displace the large ascarosides;
  h. Recovering the desired pheromones from the hydrophobic medium using a sufficiently concentrated organic solvent; and
  i. Drying the desired pheromones for subsequent use.

In a preferred embodiment, the hydrophobic medium is a C18 column which is washed with 30% methanol water mixture to remove the small chain ascarosides and recovering the desired pheromones using a 90% methanol:water mixture. The growth medium from each species is mixed in a ratio selected from 100:1, 1:100, and all ratios in between to protect plants from plant parasitic nematodes with different modes of infection which comprises treating the plant, the roots thereof, or the seed thereof with a sufficient amount of the composition according to claim 1 to repel the nematodes, which may be sedentary, or endoparasitic, and may be selected from the *Meloidogyne* spp, cyst nematodes, reniform, migratory endoparasites, and migratory ecto-parasites, including *M. incognita, M. javanica, M. hapla*, soybean cyst, sugar beet cyst nematodes.

Certain references are cited in this patent disclosure. To ensure full citation, the following reference list is provided as follows:

Aggarwal V, Deng X, Tuli A, Goh K S (2013) Diazinon-chemistry and environmental fate: a California perspective. Rev. Envir. Cont. Toxicol. 223: 107-140

Castagnone-Sereno P, Danchin E G, Perfus-Barbeoch L, Abad P (2013) Diversity and evolution of root-knot nematodes, genus *Meloidogyne*: new insights from the genomic era. Annu. Rev. Phytopat. 51: 203-220

Choe A, von Reuss S H, Kogan D, Gasser R B, Platzer E G, Schroeder F C, Sternberg P W (2012) Ascaroside signaling is widely conserved among nematodes. Curr Biol 22: 772-780

Cook S M, Khan Z R, Pickett J A (2007) The use of push-pull strategies in integrated pest management. Annu. Rev. Entomol. 52: 375-400

EPA (2010) Aldicarb; Notice of Receipt of Request to Voluntarily Cancel a Pesticide Registration. In: Register F (ed) 75 FR 62129, pp 62129-62131

Fortnum B A, Kasperbauer M J, Hunt P G, Bridges W C (1991) Biomass Partitioning in Tomato Plants Infected with *Meloidogyne incognita*. J Nematol. 23: 291-297

Kaplan F, Alborn H T, von Reuss S H, Ajredini R, Ali J G, Akyazi F, Stelinski L L, Edison A S, Schroeder F C, Teal P E (2012) Interspecific nematode signals regulate dispersal behavior. PLoS One 7: e38735

Khan Z R, Pickett J A, van den Berg J, Wadhams L J, Woodcock C M (2000) Exploiting chemical ecology and species diversity: stem borer and striga control for maize and sorghum in Africa. Pest Manag. Sci. 56: 957-962

Manosalva P, Manohar M, von Reuss S H, Chen S, Koch A, Kaplan F, Choe A, Micikas R J, Wang X, Kogel K H, Sternberg P W, Williamson V M, Schroeder F C, Klessig D F (2015) Conserved nematode signalling molecules elicit plant defenses and pathogen resistance. Nature communications 6: 7795

Manzanilla-Lopez R H, Starr J L (2009) Interactions with other pathogens. In: Perry R N, Moens M, Starr J L (eds) Root-Knot Nematodes. CAB International, Cambridge, pp 223-245

Msayleb N, Ibrahim S (2011) Treatment of nematodes with ozone gas: A sustainable alternatives to nematicides. Physics Procedia 21: 187-192

Perry R N, Moens M, Starr J L (2009) *Meloidogyne* species—a diverse group of novel and important parasites. In: Perry R N, Moens M, Starr J L (eds) Root-Knot Nematodes. CAB International, Cambridge, pp 1-17

Silverstein R M (1981) Pheromones: background and potential for use in insect pest control. Science 213: 1326-1332

Srinivasan J, Kaplan F, Ajredini R, Zachariah C, Alborn H T, Teal P E, Malik R U, Edison A S, Sternberg P W, Schroeder F C (2008) A blend of small molecules regulates both mating and development in *Caenorhabditis elegans*. Nature 454: 1115-1118

Zasada I A, Halbrendt J M, Kokalis-Burelle N, LaMondia J, McKenry M V, Noling J W (2010) Managing nematodes without methyl bromide. Ann. Rev. Phytopat. 48: 311-328

What is claimed is:

1. A synergistic composition comprising two or more ascarosides including ascaroside #10 and ascaroside 18, wherein the ratio of ascaroside #10 and ascaroside #18 is between 1:2 to 1:12, and does not have ascaroside #9; and,
    wherein said synergistic composition redirects to other plants, averts, dissuades, and/or deters parasitic nematodes from colonizing areas, plants, roots, stem, bulbs, plant parts, and/or seeds that have been sprayed, coated and/or treated by said synergistic composition.

2. The composition according to claim 1, wherein said areas comprise plant root irrigation systems and/or its surrounding areas.

3. A seed or seed coating agent comprising the synergistic composition according to claim 1.

4. The synergistic composition according to claim 1, further comprises at least one pesticide, biocontrol organisms, and/or biopesticide.

5. A plant stem, root, plant parts, and/or bulb coated, sprayed, and/or treated with the synergistic composition according to claim 1.

6. A method of making the synergistic composition of claim 1, said method comprising:
    a. extracting nematode pheromones from infected plant roots, or purifying pheromones mixture from other nematodes species' growth medium; or
    b. purifying the nematode pheromones from growth medium of *Heterorhabditis*, and *Steinernema* spp., individually or after mixing of growth media, wherein said growth media are selected from the insect host or the artificial liquid growth medium which produces infective juveniles; and wherein said purifying step of 8(a) or 8(b) includes the steps of:
    i. growing infective juveniles of *Heterorabditis* species in a growth medium and retaining the growth medium after removing the *Heterorabditis* species therefrom;
    ii. growing infective juveniles of *Steinernema* species in a growth medium and retaining the growth medium after removing the *Steinernema* species therefrom;
    iii. drying each the growth medium, either separately or after mixing said growth media from each species in an ratio;
    iv. extracting the nematode pheromone from the growth media that has been dried, using an organic solvent, followed by drying;
    v. resuspending the product of step (iv) in distilled water or another aqueous medium,
    vi. removing insoluble material by centrifugation or filtration and retaining the liquid for further purification;
    vii. removing the nematode pheromone including small chain ascaroside by non-adhesion to a hydrophobic medium washed with an organic solvent;
    viii. recovering desired nematode pheromones from the hydrophobic medium using a concentrated organic solvent;
    vi. drying the desired nematode pheromones;
    x. washing a C18 column which includes the hydrophobic medium with 30% methanol water mixture to remove the small chain ascarosides and ascaroside #9, and
    xi. recovering the nematode pheromones using a 90% methanol:water mixture.

7. The method according to claim 6 wherein the growth medium from each species is mixed in a ratio selected from 100:1 to 1:100.

8. A method to protect plants from plant parasitic nematodes with different modes of infection comprising the step of
    treating the plant, roots, roots, stem, bulbs, plant parts, and/or seed thereof with an effective amount of the synergistic composition according to claim 1, to cause the parasitic plant nematode to be redirected to other/healthy plants, or deterred, averted and/or dissuaded from colonizing the plant.

9. The method according to claim 8, wherein the parasitic nematodes treated includes sedentary, or endoparasitic nematodes selected from the *Meloidogyne* spp., cyst nematodes, reniform, migratory endoparasites, and migratory ecto-parasites.

10. The method according to claim 9, wherein the method is effective against treating *M. incognita, M. javanica, M. hapla*, soybean cyst nematodes and/or sugar beet cyst nematodes.

* * * * *